United States Patent [19]

Lyakhevich et al.

[11] Patent Number: 4,499,218

[45] Date of Patent: Feb. 12, 1985

[54] VULCANIZABLE RUBBER COMPOUND

[76] Inventors: Genrikh D. Lyakhevich, ulitsa Matusevicha, 3, kv. 146, Minsk; Vasily G. Suzansky, ulitsa Gorkogo, 28, kv. 33; Vulf P. Kovalerchik, ulitsa Oktyabrskaya, 197, kv. 78, both of Bobruisk, all of U.S.S.R.

[21] Appl. No.: 270,386

[22] Filed: Jun. 4, 1981

[51] Int. Cl.$^3$ .......................... C08L 7/00; C08L 9/00; C08L 9/02; C08J 11/04

[52] U.S. Cl. ........................................ 524/79; 521/41; 524/565; 524/571; 585/241

[58] Field of Search .......................... 260/2.3; 585/241; 521/41; 525/383; 524/79, 565, 571

[56] References Cited

U.S. PATENT DOCUMENTS 3,582,279  6/1971  Beckman et al. ...................... 521/41

FOREIGN PATENT DOCUMENTS

| 452085 | 10/1948 | Canada | 521/41 |
| 55-50045 | 4/1980 | Japan | 260/2.3 |
| 580051 | 8/1946 | United Kingdom | 521/41 |
| 317664 | 10/1971 | U.S.S.R. | 524/79 |

OTHER PUBLICATIONS

Chemical Abstracts, 77:127,665y, 1972.
Chemical Abstracts, 85:144,247P, 1976.

*Primary Examiner*—Allan M. Lieberman
*Attorney, Agent, or Firm*—Burgess, Ryan & Wayne

[57] ABSTRACT

Vulcanizable rubber stock based on diene rubber comprises oxidized oligomer derived from thermally decomposed rubber materials, which oligomer has a molecular weight of 450–86,000 and is contained in the compound in an amount of 5–68 parts by weight per 100 parts by weight of diene rubber.

11 Claims, No Drawings

VULCANIZABLE RUBBER COMPOUND

BACKGROUND OF THE INVENTION

The invention relates to vulcanizable rubber stock and is applicable in the rubber producing industry.

Much attention is given at present to the problem of damping vibration in various machines and mechanisms during operation. For the purpose of damping vibration use is made of various damping pads made of rubber. However, the strength and vibration-damping properties of these rubber pads do not meet present requirements. Therefore providing new vulcanizable rubber compounds which produce a rubber having high vibration-damping properties remains an urgent problem to be solved.

A vulcanizable rubber stock based on diene rubber, comprising a damping substance is known USSR Author's Certificate No 618,386. The term "damping substance" is employed herein to mean a substance contained in a vulcanizable rubber stock to improve the vibration-damping properties thereof. As a damping substance, in the prior art vulcanizable rubber stock, use is made of coumarone-indene resin contained in said rubber stock in an amount of 20-50 parts by weight per 100 parts by weight of the diene rubber.

It is to be noted, however, that the strength and vibration-damping properties of a vulcanizate produced from the known vulcanizable rubber stocks are not high. In addition, the coumarone-indene resin used as a damping substance is toxic.

The main object of the invention is to provide a vulcanizable rubber stock for the production of a product having improved strength and vibration-damping properties.

Another object of the invention is to increase the number of starting materials which can be used to form the product having improved strength and vibration clamping properties.

SUMMARY OF THE INVENTION

These and other objects of the invention are attained in a vulcanizable rubber stock comprising an oxidized oligomer derived from thermally decomposed rubber materials, having a molecular weight of 450-86,000 as determined by a conventional viscosimetric method using the Staudinger equation (Braze Golding, Polymers and Resins, D. van Nostrand Co., Inc., 1958, pp. 78-80), and contained in said vulcanizable stock in an amount of 5-68 parts by weight per 100 parts by weight of diene rubber.

The proposed vulcanizable rubber stock makes it possible to produce a vulcanizate featuring high strength and vibration-damping properties, which retains these properties over a wide temperature range.

An evident advantage of the proposed invention is that it solves the problem of the utilization of waste produced in rubber production.

A preferred vulcanizable rubber stock contains, as an oxidized oligomer of thermally decomposed rubber materials, the oxidized oligomer of thermally decomposed rubber materials comprising butylene rubber and butadiene-styrene rubber, taken in an amount of 5-56 parts by weight per 100 parts by weight of butadiene-nitrile rubber.

This rubber stock produces a vulcanizate having high strength at elevated temperatures and improved vibration-damping properties.

Another preferred vulcanizable rubber stock contains an oxidized oligomer of thermally decomposed rubber materials comprising butadiene-nitrile rubber, in an amount of 10-40 parts by weight per 100 parts by weight of butadiene-nitrile rubber.

This compound makes it possible to produce a vulcanizate having a high degree of elongation and excellent vibration-damping properties.

Another preferred vulcanizable rubber stock includes an oxidized oligomer of thermally decomposed rubber materials comprising butadiene rubber, in an amount of 6-60 parts by weight per 100 parts by weight of butadiene-nitrile rubber.

This rubber stock provides a vulcanizate featuring the highest strength and vibration-damping properties.

Another preferred vulcanizable rubber stock includes an oxidized oligomer of thermally decomposed rubber materials comprising butadiene-styrene rubber, taken in an amount of 8-32 parts by weight per 100 parts by weight of butadiene-methylstyrene.

This rubber stock provides a vulcanizate featuring the best vibration-damping properties.

Another vulcanizable rubber stock includes an oxidized oligomer of thermally decomposed rubber materials comprising ethylenepropylene rubber, taken in an amount of 7-14 parts by weight per 100 parts by weight of butadiene-nitrile rubber.

This rubber stock provides a light vulcanizate, with high-physico-mechanical and vibration-damping properties being retained.

Another vulcanizable rubber stock includes an oxidized oligomer of thermally decomposed rubber material comprising isobutylene rubber and butadiene-nitrile rubber, taken in an amount of 6-52 parts by weight per 100 parts by weight of butadiene-methylstyrene rubber.

This rubber stock provides a vulcanizate which has high strength at low temperatures, and retains the high vibration-damping properties.

In a preferred embodiment, an oxidized oligomer derived from thermally decomposed rubber materials use is made of oxidized oligomer derived from thermally decomposed rubber materials comprising isobutylene rubber and ethylenepropylene rubber, taken in an amount of 8-57 parts by weight per 100 parts by weight of butadiene-nitrile rubber.

This rubber stock provides the lightest vulcanizate having high strength and vibration-damping properties at low temperatures.

In a further embodiment as an oxidized oligomer derived from thermally decomposed rubber materials use is made of oxidized oligomer of thermally decomposed rubber materials comprising butadiene rubber and butadiene-styrene rubber, taken in an amount of 5-50 parts by weight per 100 parts by weight of butadiene-nitrile rubber.

This rubber stock provides a vulcanizate which has the best vibration-damping properties at low temperatures.

In a further preferred embodiment as an oxidized oligomer derived from thermally decomposed rubber materials use is made of oxidized oligomer of thermally decomposed rubber materials comprising isoprene rubber, taken in an amount of 5-40 parts by weight per 100 parts by weight of butadiene-nitrile rubber.

This rubber stock provides the most suitable conditions for the production of vulcanizate, wherein the amount of the pollutants discharged is minimized.

DETAILED DESCRIPTION OF THE INVENTION

The nature of the invention will be clear from the following specific embodiments.

EXAMPLE 1

A vulcanizable rubber stock of the invention comprises /in parts by weight/:
- butadiene-nitrile rubber—100
- high-temperature bitumen—5
- stearin—1
- phenyl-β-naphthylamine—0.75
- zinc oxide—1
- sulfur—1
- diphenyl guanidine—1
- carbon black—20
- oxidized oligomer derived from thermally decomposed rubber materials based on butylene rubber and butadiene-styrene rubber—5

The oxidized oligomer derived from thermally decomposed rubber materials based on butylene rubber and butadiene-styrene rubber was produced in the following way.

Rubber waste consisting of butylene and butadiene-styrene rubber was heated at a temperature of 415° C. and a pressure of $1.9 \times 10^5 N/m^2$ for 0.8 hour to cause thermal decomposition of said rubber. Then the resulting mix was air-blown at a temperature of 282° C. and a pressure of $1.9 \times 10^5 N/m^2$ for 35 hours to cause the oligomer derived from thermally decomposed rubber materials to oxidize. The consumption of air to effect said oligomer oxidation was 47 l/hr per kg of final product. The thus produced oxidized oligomer had the following properties:
- density at a temperature of 20° C., g/cm$^3$—0.9 014
- molecular weight—9,268
- vitrifying temperature, °C.——102
- solubility, wt %:
    - in benzene—98.5
    - in chloroform—99.1
- presence of the functional groups, mg KOH/g:
    - hydroxyl—1.14
    - carbonyl—0.39
    - carboxyl—0.85
    - ester—8.26
- specific heat, kJ/kgK—1.89
- thermal conductivity, W/mK—0.11
- the loss tangent of a dielectric—$3.7 \times 10^{-3}$ A vulcanizable rubber stock of the invention was prepared in the following way. To 100 parts by weight of butadiene-nitrile rubber were added by passing through rolls 1 part by weight of stearin, 0.75 part by weight of phenil-β-naphthyl-amine, 1 part by weight of the diphenyl-quanidine, 1 part by weight of zinc oxide, 5 parts by weight of high-temperature bitumen, 5 parts by weight of oxidized oligomer derived from thermally decomposed rubber materials based on butylene rubber and butadiene-styrene rubber, 20 parts by weight of carbon black, and 1 part by weight of sulfur. The resulting mix was calendered and vulcanized at a temperature of 143° C., and samples of the vulcanizate thus produced were tested. The test results are given in Table 1.

EXAMPLE 2

A vulcanizable rubber-stock of the invention comprises the following ingredients /measured in parts by weight/:
- butadiene-nitrile rubber—100
- high-temperature bitumen—5
- stearin—1
- phenyl-β-naphthylamine—0.75
- zinc oxide—1
- diphenyl guanidine—1
- oxidized oligomer derived from thermally decomposed rubber materials based on butadiene-styrene rubber—25

The oxidized oligomer derived from thermally decomposed rubber materials based on butadiene-styrene rubber was produced in a similar manner as in Example 1.

The sequence of adding the ingredients of the vulcanizable rubber stock to be vulcanized to produce vulcanizate and operating conditions of the vulcanization process are similar to those disclosed in Example 1. The test results are given in Table 1.

EXAMPLE 3

A vulcanizable rubber compound of the invention comprises the following ingredients /in parts by weight/:
- butadiene-nitrile rubber—100
- high-temperature bitumen—5
- stearin—1
- phenyl-β-naphthylamine—0.75
- zinc oxide—1
- sulfur—1
- diphenyl guanidine—1
- carbon black—20
- oxidized oligomer derived from thermally decomposed rubber materials based on butylene and butadiene-styrene rubber—56

The oxidized oligomer derived from thermally decomposed rubber materials based on the butylene and butadiene-styrene rubber was produced substantially as disclosed in Example 1.

The sequence of adding the ingredients of the vulcanizable rubber stock to be vulcanized to produce vulcanizate and operating conditions of said process are also similar to those disclosed in Example 1. The test results are given in Table 1.

EXAMPLE 4

A vulcanizable rubber stock of the invention comprises the following ingredients /in parts by weight/:
- butadiene-nitrile rubber—100
- bitumen with a high melting point—5
- stearin—1
- phenyl-β-naphthylamine—0.75
- zinc oxide—1
- sulfur—1
- diphenyl guanidine—1
- carbon black—20
- oxidized oligomer derived from thermally decomposed rubber materials based on butadiene-styrene rubber—60

The oxidized oligomer derived from thermally decomposed rubber materials based on butadiene-styrene rubber was produced substantially as disclosed in Example 1.

The sequence of adding the ingredients of the rubber stock to be vulcanized to produce vulcanizate, and operating conditions of vulcanization are similar to those disclosed in Example 1. The test results are given in Table 1.

TABLE 1

| Properties | Examples | | | | Auth. Cert. No. 618,386 |
|---|---|---|---|---|---|
| | 1 | 2 | 3 | 4 | |
| Tensile strength, at 20° C., kg/cm$^2$ | 137 | 154 | 140 | 135 | 100 |
| Tensile strength at 100° C. kg/cm$^2$ | 98 | 121 | 101 | 87 | 60 |
| Elongation, % | 631 | 654 | 658 | 649 | — |
| Permanent elongation, % | 14 | 15 | 20 | 25 | — |
| Loss factor | 0.25 | 0.47 | 0.45 | 0.34 | — |
| Vibration increase at a resonance frequency | 2.8 | 1.9 | 2.0 | 2.3 | 3 |
| Modulus of elasticity 10$^{-9}$ N/m$^2$ | 2.8 | 3.9 | 3.5 | 3.5 | — |
| Loss modulus 10$^{-9}$ Nm$^2$ | 0.7 | 4.18 | 3.83 | 1.19 | — |

EXAMPLE 5

A vulcanizable rubber stock of the invention comprises the following ingredients :measured in parts by weight/:
  butadiene-nitrile rubber—100
  bitumen with a high melting point—5
  stearin—1
  phenyl-$\beta$-naphthylamine—0.75
  zinc oxide—1
  sulfur—1
  carbon black—20
  diphenyl guanidine—1
  oxidized oligomer derived from thermally decomposed rubber materials based on butadiene rubber—6

The oxidized oligomer derived from thermally decomposed rubber materials based on butadiene rubber was produced as follows.

Rubber waste, namely, butadiene rubber was heated at a temperature of 373° C. and a pressure of $4.6 \times 10^5 \text{N/m}^2$ for 2.5 hours to cause said rubber to decompose. The resulting product was air-blown at a temperature of 271° C. and a pressure of $2.4 \times 10^5 \text{N/m}^2$ for 1.9 hours to cause the oligomer derived from the decomposed butadiene rubber to oxidize, with the consumption of air required for the oxidation process being 65 l/hr per kg of resulting product.

The thus produced oxidized oligomer had the following properties:
  density at 20° C., g/cm$^3$—0.9204
  molar weight—30,236
  vitrifying temperature, °C.— —107
  solubility, wt%:
    in benzene—98.7
    in chloroform—99.8
  presence of the functional groups: mg KOH/g
    hydroxyl—9.12
    carbonyl—0.95
    carboxyl—2.39
    ester—17.25
  specific heat, kJ/kgK—1.72
  thermal conductivity, W/(mk)—0.13
  the loss tangent of a dielectric—$1.4 \times 10^{-3}$ The sequence of introducing ingredients of the rubber stock to be vulcanized to produce vulcanizate was similar to that disclosed in Example 1. The resulting vulcanizate was tested. The test results are given in Table 2.

EXAMPLE 6

A vulcanizable rubber stock of the invention comprises the following ingredients /measured in parts by weight/:
  butadiene-nitrile rubber—100
  bitumen with a high melting point—5
  stearin—1
  phenyl-$\beta$-naphthylamine—0.75
  zinc oxide—1
  sulfur—1
  diphenyl guanidine—1
  carbon black—20
  oxidized oligomer derived from thermally decomposed rubber materials based on butadiene rubber—30

The oxidized oligomer derived from thermally decomposed rubber materials based on butadiene rubber was produced substantially as disclosed in Example 5.

The sequence of introducing the ingredients of the rubber stock to be vulcanized during the process of producing vulcanizate and operating conditions of said process are similar to those described in Example 1. The resultant vulcanizate was tested, the test results are tabulated in Table 2.

EXAMPLE 7

A vulcanizable rubber stock of the invention comprises the following ingredients /measured in parts by weight/:
  butadiene-nitrile rubber—100
  bitumen with a high melting point—5
  stearin—1
  phenyl-$\beta$-naphthylamine—0.75
  zinc oxide—1
  sulfur—1
  diphenyl guanidine—1
  carbon black—20
  oxidized oligomer derived from thermally decomposed rubber materials based on butadiene rubber—60

The oxidized oligomer derived from thermally decomposed rubber materials based on butadiene rubber was produced substantially as disclosed in Example 5.

The sequence of adding the ingredients of the rubber stock to be vulcanized during the process of producing vulcanizate and operating conditions of said process were similar to those disclosed in Example 1. The resultant vulcanisate was tested, the test results are tabulated in Table 2.

EXAMPLE 8

A vulcanizable rubber stock of the invention comprises the following ingredients /measured in parts by weight/:
  butadiene-methyl styrene rubber—100
  bitumen with a high melting point—5
  stearin—1
  phenyl-$\beta$-naphthylamine—0.75
  zinc oxide—1
  sulfur—1
  diphenyl guanidine—1
  carbon black—20 oxidized oligomer derived from thermally decomposed rubber materials based on butadiene rubber—65

The oxidized oligomer derived from thermally decomposed rubber materials based on the butadiene rubber was produced substantially as described in Example 5.

The sequence of introducing the ingredients of the rubber stock to be vulcanized during the process of producing vulcanizate and operating conditions of the process were similar to those disclosed in Example 1. The resulting vulcanizate was tested. The test results are given in Table 2.

TABLE 2

| Properties | Examples | | | |
|---|---|---|---|---|
| | 5 | 6 | 7 | 8 |
| Tensile strength at 20° C., kg/cm² | 150 | 159 | 151 | 146 |
| Tensile strength at 100° C., kg/cm² | 96 | 108 | 93 | 93 |
| Elongation, % | 656 | 678 | 679 | 681 |
| Permanent elongation, % | 15 | 16 | 19 | 26 |
| Vibration increase at a resonance frequency | 2.4 | 1.9 | 1.8 | 1.85 |
| Loss factor | 0.30 | 0.47 | 0.52 | 0.50 |
| Modulus of elasticity, $10^{-9}$ N/m² | 4.1 | 9.1 | 9.3 | 9.2 |
| Loss modulus, $10^{-9}$ N/m² | 1.23 | 4.28 | 4.84 | 4.6 |

EXAMPLE 9

A vulcanizable rubber stock of the invention contains the following ingredients /measured in parts by weight/:
butadiene-methyl styrene rubber—100
bitumen with a high melting point—5
stearin—1
phenyl-$\beta$-naphthylamine—0.75
zinc oxide—1
sulfur—1
diphenyl guanidine—1
carbon black—20
oxidized oligomer derived from thermally decomposed rubber materials based on butadiene-styrene rubber—8

Oxidized oligomer derived from thermally decomposed rubber materials based on butadiene-styrene rubber was produced in the following manner.

Rubber waste consisting of butadiene-styrene rubber was subjected to thermal treating at a temperature of 409° C. and a pressure of $1.8 \times 10^5$ N/m² for 0.7 hour so as to cause said rubber to decompose. The resulting mix was then air-blown at a temperature of 265° C., and a pressure of $1.9 \times 10^5$ N/m² for a period of 4.3 hours, thereby causing said oligomer to oxidize. The consumption of air for the oxidation process was 38 l/hr per kg of resultant product.

The resultant oxidized oligomer derived from thermally decomposed rubber materials based on butadiene-styrene rubber had the following properties:
density at 20° C., g/cm³—0.9331
molecular weight—452
vitrifying temperature, °C.— −68
solubility, wt %:
in benzene—99.9
in chloroform—99.9
Presence of the functional groups: mg KOH/g
hydroxyl—11.45
carbonyl—0.78
carboxyl—2.45
ester—18.14
specific heat, kJ/kgK—1.78
thermal conductivity, W/(mK)—0.14
the loss tangent of a dielectric—$1.8 \times 10^{-3}$ The sequence of introducing the ingredients of the vulcanizable rubber stock to be vulcanized during vulcanization and operating conditions thereof were similar to those disclosed in Example 1. The resultant product was tested. The test results are given in Table 3.

EXAMPLE 10

A vulcanizable rubber stock of the invention comprises the following ingredients /measured in parts by weight/:
butadiene-methylstyrene rubber—100
bitumen with a high melting point—5
stearin—1
phenyl-$\beta$-naphthylamine—0.75
zinc oxide—1
sulfur—1
diphenyl guanidine—1
carbon black—20
oxidized oligomer derived from thermally decomposed rubber materials based on butadiene-styrene rubber—15

Oxidized oligomer derived from thermally decomposed rubber materials based on butadiene-styrene rubber was produced substantially as disclosed in Example 1.

The sequence of introducing the ingredients of the rubber stock to be vulcanized to produce vulcanizate and operating conditions of vulcanization were similar to those disclosed in Example 1. The resultant product was tested. The test results are given in Table 3.

EXAMPLE 11

A vulcanizable rubber stock of the invention comprises the following ingredients /measured in parts by weight/:
butadiene-methyl styrene rubber—100
bitumen with high melting point—5
stearin—1
phenyl-$\beta$-naphthylamine—0.75
zinc oxide—1
sulfur—1
diphenyl guanidine—1
carbon black—20
oxidized oligomer derived from thermally decomposed rubber materials based on butadiene-styrene rubber—32

Oxidized oligomer derived from thermally decomposed rubber materials based on butadiene-styrene rubber was produced substantially as disclosed in Example 1.

The sequence of adding the ingredients of the rubber stock to be vulcanized and the operating conditions of vulcanization were similar to those described in Example 1. The test results of the resultant vulcanizate samples are given in Table 3.

EXAMPLE 12

A vulcanizable rubber stock according to the invention comprises the following ingredients /measured in parts by weight/:
butadiene-methyl styrene rubber—100
bitumen with high melting point—5
stearin—1 phenyl-β-naphthylamine—0.75
zinc oxide—1
sulfur—1
diphenyl guanidine—1
carbon black—20
oxidized oligomer derived from thermally decomposed rubber materials based on butadiene-styrene rubber—40

Oxidized oligomer derived from thermally decomposed rubber materials based on butadiene-styrene rubber was produced substantially as disclosed in Example 1.

The sequence of adding the ingredients of the rubber stock to be vulcanized and operating conditions of vulcanization are similar to those described in Example 1. The samples of the resulting vulcanisate were tested. The test results are given in Table 3.

TABLE 3

| Properties | Examples | | | |
|---|---|---|---|---|
| | 9 | 10 | 11 | 12 |
| | 1 2 | 3 | 4 | 5 |
| Tensile strength at 20° C., kg/cm² | 118 | 129 | 125 | 109 |
| Tensile strength at 100° C., kg/cm² | 72 | 83 | 80 | 65 |
| Elongation, % | 626 | 645 | 648 | 641 |
| Permanent elongation, % | 23 | 24 | 31 | 38 |
| Vibration increase at a resonance frequency | 2.7 | 1.8 | 1.85 | 1.9 |
| Loss factor | 0.28 | 0.51 | 0.49 | 0.47 |
| Elasticity modulus, $10^{-9}$ N/m² | 2.9 | 9.2 | 8.7 | 8.3 |
| Loss modulus, $10^{-9}$ N/m² | 0.81 | 4.69 | 4.26 | 3.9 |

EXAMPLE 13

A vulcanizable rubber stock according to the invention has the following composition /measured in parts by weight/:
butadiene-nitrile rubber—100
bitumen with a high melting point—5
stearin—1
phenyl-β-naphthylamine—0.75
zinc oxide—1
sulfur—1
diphenyl guanidine—1
carbon black—20
oxidized oligomer derived from thermally decomposed rubber materials based on ethylene propylene rubber—7

Oxidized oligomer derived from thermally decomposed rubber materials based on ethylene propylene rubber was produced in the following manner.

Rubber waste consisting of ethylene propylene rubber was heated at a temperature of 397° C. and a pressure of $3.4 \times \times 10^5 N/m^2$ for 2 hours to cause the rubber to decompose. The product thus obtained was air-blown at a temperature of 275° C. and a pressure of $2.5 \times 10 N/m^2$ for 2.1 hours to cause the oligomer to oxidize, with the consumption of air being 68 l/hr per kg of resultant product.

The resultant oligomer derived from thermally decomposed rubber materials based on ethylene propylene rubber had the following properties:
density at 20° C., g/cm³—0.8592
molar weight—12,934
vitrifying temperature, °C.—−95
solubility, wt %:
in benzene—98.4
in chloroform—99.8
presence of the functional groups: mg KOH/g
hydroxyl—1.12
carbonyl—0.23
carboxyl—0.97
ester—7.15
specific heat, kJ/kgK—1.87
thermal conductivity, W/(mK)—0.10
loss tangent of a dielectric—$1.1 \times 10^{-3}$ The sequence of adding the ingredients of the rubber stock to be vulcanized and operating conditions of producing vulcanizate are similar to those disclosed in Example 1. The samples of the thus produced vulcanizate are summarized in Table 4.

EXAMPLE 4

A vulcanizable rubber stock according to the invention has the following composition /measured in parts by weight/:
butadiene-nitrile rubber—100
bitumen with a high melting point—5
stearin—1
phenyl-β-naphthylamine—0.75
zinc oxide—1
sulphur—1
diphenyl guanidine—1
carbon black—20
oxidized oligomer derived from thermally decomposed rubber materials based on ethylene propylene rubber—30

The oxidized oligomer derived from thermally decomposed rubber materials was obtained using the procedure similar to that described in Example 13.

The sequence of adding the ingredient of the rubber compound to be vulcanized and operating conditions of the vulcanization process were the same as adopted in Example 1. Samples of the vulcanizate thus produced were tested and the test results are summarized in Table 4.

EXAMPLE 15

A vulcanizable rubber stock according to the invention has the following composition /measured in parts by weight/:
butadiene-nitrile rubber—100
bitumen with a high melting point—5
stearin—1
phenyl-β-naphthylamine—0.75
zinc oxide—1
sulfur—1
diphenyl guanidine—1
carbon black—20
oxidized oligomer derived from thermally decomposed rubber materials based on ethylene propylene rubber—64

The oxidized oligomer derived from thermally decomposed rubber materials based on ethylene propylene rubber was obtained following the procedure substantially similar to that described in Example 13.

The sequence of adding the ingredients of the rubber stock to be vulcanized and operating conditions of the vulcanization process were the same as adopted in Example 1. Samples of the thus produced vulcanizate were tested and the test results are summarized in Table 4.

TABLE 4

| Properties | Examples | | |
|---|---|---|---|
| | 13 | 14 | 15 |
| Tensile strength at 20° C., kg/cm$^2$ | 149 | 150 | 145 |
| Tensile strength at 100° C., kg/cm$^2$ | 85 | 90 | 83 |
| Elongation, % | 652 | 663 | 678 |
| Permanent elongation, % | 15 | 18 | 30 |
| Vibration increase at a resonance frequency | 2.8 | 2.0 | 2.1 |
| Loss factor | 0.26 | 0.49 | 0.46 |
| Elasticity modulus, 10$^{-9}$ N/m$^2$ | 2.7 | 8.8 | 8.4 |
| Loss modulus, 10$^{-9}$ N/m$^2$ | 0.7 | 4.31 | 3.86 |

EXAMPLE 16

A vulcanizable rubber stock according to the invention has the following composition /measured in parts by weight/:
  butadiene-methyl styrene rubber—100
  bitumen having a high melting point—5
  stearin—1
  phenyl-$\beta$-naphthylamine—0.75
  zinc oxide—1
  sulfur—1
  diphenyl guanidine—1
  carbon black—20
  oxidized oligomer derived from thermally decomposed rubber materials based on isobutylene and butadiene-nitrile rubber—6

The oxidized oligomer derived from thermally decomposed rubber materials based on isobutylene and butadiene-nitrile rubber was obtained using the following procedure.

Rubber waste consisting of isobutylene and butadiene-nitrile rubber were heated at a temperature of 381° C. and a pressure of $3.6 \times 10^5$ N/m$^2$ for a period of 2.9 hours to cause said rubber to decompose. The resulting material thus obtained was air-blown at a temperature of 258° C., and a pressure of $2.6 \times 10^5$ N/m$^2$ for 4.6 hours to cause the oligomers derived from the decomposed rubber materials to oxidize, with the air consumption being 52 l/hr per kg of resultant product.

The oligomer thus produced had the following properties:
  density at 20° C., g/cm$^3$—0.9293
  molar weight—1.965
  vitrifying temperature, °C.—$-110$
  solubility, wt %:
    in benzene—96.4
    in chloroform—98.2
  presence of the functional groups, mg KOH/g:
    hydroxyl—0.21
    carbonyl—0.10
    carboxyl—0.28
    ester—1.43
  specific heat, kJ/kgK—1.72
  thermal conductivity, W/(mK)—0.09
  loss tangent of a dielectric—$1.1 \times 10^{-3}$ The sequence of adding the ingredients of the rubber compound to be vulcanized and operating conditions of the vulcanization process were the same as adopted in Example 1. Samples of the vulcanizate thus produced were tested. The test results are given in Table 5.

EXAMPLE 17

A vulcanizable rubber stock of the invention has the following composition /measured in parts by weight/:
  butadiene-methyl styrene rubber—100
  bitumen with a high melting point—5
  stearin—1
  phenyl-$\beta$-naphthylamine—0.75
  zinc oxide—1
  sulfur—1
  diphenyl guanidine—1
  carbon black—20
  oxidized oligomer derived from thermally decomposed rubber materials based on isobutylene and butadiene-nitrile rubber—30

Oxidized oligomer derived from thermally decomposed rubber materials based on isobutylene and butadiene-nitrile rubber was produced following the procedure described in Example 16.

The sequence of adding the ingredients of the rubber stock to be vulcanized and operating conditions of vulcanization were the same as adopted in Example 1. Samples of the resulting vulcanizate thus produced were tested. The test results are summerized in Table 5.

EXAMPLE 18

A vulcanizable rubber stock according to the invention has the following composition /measured in parts by weight/:
  butadiene-methyl styrene rubber—100
  bitumen with a high melting point—5
  stearin—1
  phenyl-$\beta$-naphthylamine—0.75
  zinc oxide—1
  sulfur—1
  diphenyl guanidine—1
  carbon black—20
  oxidized oligomer derived from thermally decomposed rubber materials based on isobutylene and butadiene-nitrile rubber—52

Oxidized oligomer derived from thermally decomposed rubber material based on isobutylene and butadiene-nitrile rubber was produced using the procedure substantially similar to that described in Example 16.

The sequence of admixing the ingredients of the rubber stock to be vulcanized and operating conditions of vulcanization were the same as adopted in Example 1. Samples of the vulcanizate thus produced were tested. The test results are summarized in Table 5.

TABLE 5

| Properties | Examples | | |
|---|---|---|---|
| | 16 | 17 | 18 |
| Tensile strength at 20° C., kg/cm$^2$ | 114 | 120 | 113 |
| Tensile strength at 100° C., kg/cm$^2$ | 71 | 74 | 68 |
| Elongation, % | 632 | 645 | 646 |
| Permanent elongation, % | 26 | 27 | 34 |
| Vibration increase at a resonance frequency | 2.5 | 1.9 | 1.7 |
| Loss factor | 0.34 | 0.48 | 0.53 |
| Elasticity modulus, 10$^{-9}$ N/m$^2$ | 3.7 | 8.5 | 9.4 |
| Loss modulus, 10$^{-9}$ N/m$^2$ | 1.26 | 4.8 | 4.98 |

EXAMPLE 19

A vulcanizable rubber stock according to the invention has the following composition /measured in parts by weight/:
- butadiene-nitrile rubber—100
- bitumen—5
- stearin—1
- phenyl-$\beta$-naphthylamine—0.75
- zinc oxide—1
- sulfur—1
- diphenyl guanidine—1
- carbon black—20
- oxidized oligomer derived from thermally decomposed rubber materials based on isobutylene and ethylene propylene rubber—8

Oxidized oligomer derived from thermally decomposed rubber materials based on isobutylene and ethylene propylene rubber was produced using the following procedure.

Rubber waste, namely, isobutylene and ethylene-propylene rubber were subjected to heat treating at a temperature of 418° C. at a pressure $1.3 \times 10^5 N/m^2$ for 0.8 hour to cause thermal decomposition of said rubber. The resulting mixture was air-blown at a temperature of 293° C., and a pressure $2.1 \times 10^5 N/m^2$ for 0.9 hour to cause the resultant oligomers to oxidize, the air consumption was 100 l/hr per kg of resulting product.

The oligomer thus produced had the following properties:
- density at 20° C., g/cm³—0.8 931
- molar weight—8,049
- vitrifying temperature, °C.—− 114
- solubility, wt %:
  - in benzene—99.1
  - in chloroform—99.6
- presence of the functional groups, mg KOH/g:
  - hydroxyl—0.98
  - carbonyl—0.17
  - carboxyl—1.19
  - ester—8.12
- specific heat, kJ/kgK—1.73
- thermal conductivity, W/(mK)—0.10
- loss tangent of a dielectric—$4.6 \times 10^{-3}$ The sequence of admixing the ingredients of the rubber stock to be vulcanized and operating conditions of vulcanization were the same as adopted in Example 1. Samples of the resultant vulcanizate were tested. The test results are tabulated on Table 6.

EXAMPLE 20

A vulcanizable rubber stock according to the invention has the following composition /measured in parts by weight/:
- butadiene-nitrile rubber—100
- bitumen having a high melting point—5
- stearin—1
- phenyl-$\beta$-naphthylamine—0.75
- zinc oxide—1
- sulfur—1
- diphenyl guanidine—1
- carbon black—20
- oxidized oligomer derived from thermally decomposed rubber materials based on isobutylene and ethylene propylene rubber—30

Oxidized oligomer which, before being oxidized, was derived from rubber materials based on isobutylene and ethylene-propylene rubber, as a result of thermal decomposition thereof, was produced using the procedure adopted in Example 19.

The sequence of adding the ingredients of the rubber stock to be vulcanized and operating conditions of vulcanization were the same as described in Example 1. Samples of the resultant vulcanizate were tested. The test results are summarized in Table 6.

EXAMPLE 21

A vulcanizable rubber stock according to the invention has the following composition /measured in parts by weight/:
- butadiene-nitrile rubber—100
- bitumen with a high melting point—5
- stearin—1
- phenyl-$\beta$-naphthylamine—0.75
- zinc oxide—1
- sulfur—1
- diphenyl guanidine—1
- carbon black—20
- oxidized oligomer derived from thermally decomposed rubber materials based on isobutylene and ethylene propylene rubber—57

Oxidized oligomer derived from thermally decomposed rubber materials based on isobutylene and ethylene propylene rubber was obtained using the procedure substantially similar to that described in Example 19.

The sequence of adding the ingredients of the rubber stock to be vulcanized and operating conditions of vulcanization were the same as adopted in Example 1. Samples of the resultant vulcanizate were tested, the test results are summarized in Table 6.

EXAMPLE 22

Vulcanizable rubber stock according to the invention has the following composition /measured in parts by weight/:
- butadiene-nitrile rubber—100
- bitumen with a high melting point—5
- stearin—1
- phenyl-$\beta$-naphthylamine—0.75
- zinc oxide—1
- sulfur—1
- diphenyl guanidine—1
- carbon black—20
- oxidized oligomer derived from thermally decomposed rubber materials based on isobutylene and ethylene propylene rubber—5

Oxidized oligomer derived from thermally decomposed rubber materials based on isobutylene and ethylene propylene rubber was produced using the procedure substantially similar to that described in Example 19.

The sequence of adding the ingredients of the rubber stock to be vulcanized and operating conditions of vulcanization were the same as adopted in Example 1. Samples of the resultant vulcanizate were tested. The test results are summarized in Table 6.

TABLE 6

| Properties | Examples | | | |
| --- | --- | --- | --- | --- |
| | 19 | 20 | 21 | 22 |
| 1 | 2 | 3 | 4 | 5 |
| Tensile strength at 20° C., kg/cm² | 141 | 154 | 150 | 142 |
| Tensile strength at 100° C., kg/cm² | 84 | 92 | 83 | 86 |
| Elongation, % | 640 | 659 | 661 | 628 |
| Permanent elongation, % | 17 | 19 | 32 | 16 |

TABLE 6-continued

| Properties | Examples | | | |
|---|---|---|---|---|
| | 19 | 20 | 21 | 22 |
| | 2 | 3 | 4 | 5 |
| Vibration increase at a resonance frequency | 2.5 | 1.9 | 2.0 | 2.8 |
| Loss factor | 0.33 | 0.45 | 0.46 | 0.29 |
| Modulus of elasticity, $10^{-9}$ N/m² | 3.8 | 8.6 | 8.7 | 2.7 |
| Loss modulus, $10^{-9}$ N/m² | 1.25 | 3.87 | 4.0 | 0.78 |

EXAMPLE 23

Vulcanizable rubber stock according to the invention had the following composition /measured in parts by weight/:
 butadiene-nitrile rubber—100
 bitumen with a high melting point—5
 stearin—1
 phenyl-$\beta$-naphthylamine—0.75
 diphenyl guanidine—1
 zinc oxide—1
 sulfur—1
 carbon black—20
 oxidized oligomer derived from thermally decomposed rubber materials based on butadiene-nitrile rubber—10

Oxidized oligomer derived from thermally decomposed rubber materials based on butadiene-nitrile rubber was produced as follows.

Rubber waste, namely, butadiene-nitrile rubber was heated at a temperature of 424° C. and a pressure of $1.2 \times \times 10^5$ N/m² for a period of 0.7 hour to cause said rubber to decompose. The obtained product was air-blown at a temperature of 285° C. and a pressure of $2.5 \times \times 10^5$ N/m² for a period of 2.1 hours to cause the resultant oligomer to oxidize, the air consumption was 82 l/hr per kg of resulting product.

The oxidized oligomer thus produced has the following properties:
 density at 20° C., g/cm³—0.9 439
 molecular weight—6,467
 vitrifying temperature, °C.—−54
 solubility, wt %:
  in benzene—99.8
  in chloroform—99.9
 presence of the functional groups, mg KOH/g:
  hydroxyl—2.14
  carbonyl—0.35
  carboxyl—1.02
  ester—12.37
 specific heat, kJ/kgK—3.28
 thermal conductivity, W/(mK)—0.46
 loss tangent of a dielectric—$0.21 \times 10^{-3}$ The sequence of adding the ingredients of the rubber stock to be vulcanized and operating conditions of vulcanization were the same as adopted in Example 1. Samples of the resultant oligomer were tested. The test results are summarised in Table 7.

EXAMPLE 24

A vulcanizable rubber stock according to the invention had the following composition /measured in parts by weight/:
 butadiene-nitrile rubber—100
 bitumen with a high melting point—5
 stearin—1
 phenyl-$\beta$-naphthylamine—0.75
 diphenyl guanidine—1
 zinc oxide—1
 sulfur—1
 carbon black—20
 oxidized oligomer derived from thermally decomposed rubber materials based on butadiene-nitrile rubber—20

Oxidized oligomer derived from thermally decomposed materials based on butadiene-nitrile rubber was produced using the procedure substantially similar to that described in Example 23.

The sequence of adding the ingredients of the rubber stock to be vulcanized and operating conditions of vulcanization were the same as adopted in Example 1. Samples of the resultant vulcanizate were tested. The test results are given in Table 7.

EXAMPLE 25

A vulcanizable rubber stock according to the invention had the following composition /measured in parts by weight/:
 butadiene-nitrile rubber—100
 bitumen with a high melting point—5
 stearin—1
 phenyl-$\beta$-naphthylamine—0.75
 diphenyl gianidine—1
 zinc oxide—1
 sulfur—1
 carbon black—20
 oxidized oligomer derived from thermally decomposed rubber materials based on butadiene-nitrile rubber—40

Oxidized oligomer derived from thermally decomposed rubber materials based on butadiene-nitrile rubber was produced using the procedure substantially similar to that described in Example 23.

The sequence of adding the ingredients of the rubber stock to be vulcanized and operating conditions of vulcanization were the same as adopted in Example 1. Samples of the resultant vulcanizate were tested. The test results are given in Table 7.

EXAMPLE 26

A vulcanizable rubber stock according to the invention had the following composition /measured in parts by weight/:
 butadiene-methyl styrene rubber—100
 bitumen with a high melting point—5
 stearin—1
 phenyl-$\beta$-naphthylamine—0.75
 diphenyl guanidine—1
 zinc oxide—1
 sulfur—1
 carbon black—
 oxidized oligomer derived from thermally decomposed rubber materials based on butadiene-nitrile rubber.

Oxidized oligomer derived from thermally decomposed rubber materials based on butadiene-nitrile rubber was produced following the procedure substantially similar to that described in Example 23.

The sequence of adding the ingredients of the rubber stock to be vulcanized and operating conditions of vulcanization were the same as adopted in Example 1. Samples of the resultant vulcanizate were tested. The test results are given in Table 7.

TABLE 7

| Properties | Examples | | | |
|---|---|---|---|---|
| | 23 | 24 | 25 | 26 |
| Tensile strength at 20° C., kg/cm$^2$ | 151 | 157 | 149 | 130 |
| Tensile strength at 100° C., kg/cm$^2$ | 95 | 104 | 93 | 75 |
| Elongation, % | 679 | 681 | 687 | 621 |
| Permanent elongation, % | 12 | 14 | 18 | 23 |
| Vibration increase at a resonance frequency | 2.8 | 1.9 | 1.8 | 2.1 |
| Loss factor | 0.27 | 0.45 | 0.48 | 0.39 |
| Modulus of elasticity, $10^{-9}$ N/m$^2$ | 2.9 | 8.7 | 8.9 | 6.5 |
| Loss modulus, $10^{-9}$ N/m$^2$ | 0.78 | 3.92 | 4.27 | 2.54 |

EXAMPLE 27

A vulcanizable rubber compound according to the invention had the following composition /measured in parts by weight/:
  butadiene-nitrile rubber—100
  bitumen with a high melting point—5
  stearin—1
  phenyl-β-naphthylamine—0.75
  zinc oxide—1
  sulfur—1
  diphenyl guanidine—1
  carbon black—20
  oxidized oligomer derived from thermally decomposed rubber materials based on isoprene rubber—5

Oxidized oligomer derived from thermally decomposed rubber materials based on isoprene rubber was produced as follows.

Rubber waste consisting of isoprene rubber was subjected to thermal treating at a temperature of 412° C. and a pressure of $1.7 \times 10^5$ N/m$^2$ for 0.9 hours to cause said rubber to decompose. Thereafter, the resulting material was air-blown at a temperature of 273° C. and a pressure of $1.5 \times 10^5$ N/m$^2$ for 2.9 hours to cause the thus derived oligomer to oxidize, the air consumption was 54 l.

The oxidized oligomer thus obtained had the following properties:
  density at 20° C., g/cm$^3$—0.9 097
  molecular weight—85,890
  vitrifying temperature, °C.— —71
  solubility, wt %:
    in benzene—99.5
    in chloroform—99.8
  presence of the functional groups, mg KOH/g:
    hydroxyl—8.95
    carbonyl—0.70
    carboxyl—1.24
    ester—15.30
  specific heat, kJ/kgK—1.84
  thermal conductivity, W/mk—0.15
  loss tangent of a dielectric—$1.7 \times 10^{-3}$

EXAMPLE 28

A vulcanizable rubber stock according to the invention had the following composition /measured in parts by weight/:
  butadiene-nitrile rubber—100
  bitumen having a high melting point—5
  stearin—1
  phenyl-β-naphthylamine—0.75
  zinc oxide—1
  sulfur—1
  diphenyl guanidine—1
  carbon black—20
  oxidized oligomer derived from thermally decomposed rubber materials based on isoprene rubber—20

The oxidized oligomer derived from thermally decomposed rubber materials based on isoprene rubber was produced using the procedure substantially similar to that described in Example 27.

The sequence of adding the ingredients of the rubber stock to be vulcanized and operating conditions of vulcanization were the same as adopted in Example 1. Samples of the resultant vulcanizate were tested. The test results are summarized in Table 8.

EXAMPLE 29

A vulcanizable rubber stock according to the invention contained the following ingredients /measured in parts by weight/:
  butadiene-nitrile rubber—100
  bitumen having a high melting point—5
  stearin—1
  phenyl-β-naphthylamine—0.75
  zinc oxide—1
  sulfur—1
  diphenyl guanidine—1
  carbon black—20
  oxidized oligomer derived from thermally decomposed rubber materials based on isoprene rubber—40

The oxidized oligomer derived from thermally decomposed rubber materials based on isoprene rubber was produced following the procedure described in Example 27.

The sequence of adding the ingredients of the rubber stock to be vulcanized and operating conditions of vulcanization were the same as adopted in Example 1. Samples of the resultant vulcanizate were tested. The test results are given in Table 8.

TABLE 8

| Properties | Examples | | |
|---|---|---|---|
| | 27 | 28 | 29 |
| | 2 | 3 | 4 |
| Tensile strength at 20° C., kg/cm$^2$ | 154 | 148 | 146 |
| Tensile strength at 100° C., kg/cm$^2$ | 97 | 84 | 80 |
| Elongation, % | 685 | 679 | 65 |
| Permanent elongation % | 14 | 18 | 22 |
| Vibration increase at a resonance frequency | 2.9 | 2.4 | 1.9 |
| Loss factor | 0.26 | 0.38 | 0.5 |
| Modulus of elasticity, $10^{-9}$ N/m$^2$ | 3 | 6.7 | 9.1 |
| Loss modulus, $10^{-9}$ N/m$^2$ | 0.78 | 2.68 | 4.55 |

EXAMPLE 30

A vulcanizable rubber stock of the invention contained the following ingredients /measured in parts by weight/:
  butadiene-nitrile rubber—100
  bitumen with a high melting point—5
  stearin—1
  phenyl-β-naphthylamine—0.75
  zinc oxide—1
  sulfur—1 diphenyl guanidine—1
carbon black—
oxidized oligomer derived from thermally decomposed rubber materials based on butadiene and butadiene-styrene rubber—5

The oxidized oligomer derived from thermally decomposed rubber materials based on butadiene and butadiene-styrene rubber was produced in the following way.

Rubber waste consisting of butadiene and butadiene-styrene rubber was thermally treated at a temperature of 413° C. and a pressure of $1.6 \times 10^5 N/m^2$ for a period of 1.2 hours to cause the thermal decomposition of said rubber. Thereafter, the mix thus obtained was air-blown at a temperature of 276° C. and a pressure of $3.5 \times 10^5 N/m^2$ for a period of 2.8 hours to cause the oligomers resulting from the decomposition of said rubber materials to oxidize, with the air consumption being 61 l/hr per kg of final product.

The oxidized oligomer thus obtained has the following properties:
density at 20° C., $g/cm^3$ 0.9 285
molecular weight—16,272
vitrifying temperature, °C.——95
solubility, wt. %:
 in benzene—99.3
 in chloroform—99.7
presence of the functional groups mg KOH/g:
 hydroxyl—10.18
 carbonyl—0.71
 carboxyl—2.54
 ester—19.73
specific heat, kJ/kgK—1.76
thermal conductivity, W/(mK)—0.14
loss tangent of a dielectric—$1.5 \times 10^{-3}$ The sequence of adding the ingredients of the rubber stock to be vulcanized and operating conditions of vulcanization were the same as adopted in Example 1. Samples of the resultant vulcanizate were tested. The test results are summarized in Table 9.

EXAMPLE 31

A vulcanizable rubber stock according to the invention had the following composition /measured in parts by weight/:
butadiene-nitrile rubber—100
bitumen with a high melting point—5
stearin—1
phenyl-β-naphthylamine—0.75
zinc oxide—1
sulfur—1
diphenyl guanidine—1
carbon black—20
oxidized oligomer derived from thermally decomposed rubber materials based on butadiene and butadiene-styrene rubber—25

The oxidized oligomer derived from thermally decomposed rubber materials based on butadiene and butadiene-styrene rubber was produced using the procedure substantially similar to that described in Example 30.

The sequence of introducing ingredients of the rubber stock to be vulcanized and operating conditions of vulcanization were the same as adopted in Example 1. Samples of the resultant vulcanizate were tested. The test results are given in Table 9.

EXAMPLE 32

A vulcanizable rubber stock of the invention has the following composition /measured in parts by weight/:
butadiene-nitrile rubber—100
bitumen with a high melting point—5
stearin—1
phenyl-β-naphthylamine—0.75
zinc oxide—1
sulfur—1
diphenyl guanidine—1
carbon black—20
oxidized oligomer derived from thermally decomposed rubber materials based on butadiene and butadiene-styrene rubber—50

The oxidized oligomer derived from thermally decomposed rubber materials based on butadiene and butadiene-styrene rubber was produced using the procedure substantially similar to that described in Example 30.

The sequence of adding the ingredients of the rubber stock to be vulcanized and operating conditions of vulcanization were the same as adopted in Example 1. Samples of the resultant vulcanizate were tested. The test results are summarized in Table 9.

TABLE 9

| Properties | Examples | | |
|---|---|---|---|
| | 30 | 31 | 32 |
| Tensile strength at 20° C., $kg/cm^2$ | 134 | 156 | 130 |
| Tensile strength at 100° C., $kg/cm^2$ | 87 | 89 | 84 |
| Elongation, % | 641 | 672 | 674 |
| Permanent elongation, % | 16 | 19 | 31 |
| Vibration increase at a resonance frequency | 2.4 | 1.9 | 2.0 |
| Loss factor | 0.35 | 0.5 | 0.49 |
| Modulus of elasticity, $10^{-9} N/m^2$ | 3.9 | 9.1 | 9.0 |
| Loss modulus, $10^{-9} N/m^2$ | 1.37 | 4.55 | 4.41 |

EXAMPLE 33 (COMPARATIVE)

A vulcanizable rubber stock had the following composition /measured in parts by weight/:
butadiene-nitrile rubber—100
bitumen with a high melting point—5
stearin—1
phenyl-β-naphthylamine—0.75
zinc oxide—1
sulfur—1
diphenyl guanidine—1
carbon black—20
oxidized oligomer derived from thermally decomposed rubber materials based on isoprene rubber—4

The oxidized oligomer derived from thermally decomposed rubber materials based on isoprene rubber was produced in a manner similar to that described in Example 27.

The resultant oxidized oligomer had the following properties:
density at 20° C., $g/cm^3$—0.9 113
molecular weight—90,136
vitrifying temperature, °C.——48
solubility, wt %:
 in benzene—98.3
 in chloroform—99.2
presence of the functional groups, mg KOH/g:

hydroxyl—7.12
carbonyl—0.63
carboxyl—1.31
ester—12.9
specific heat, kJ/kgK—1.86
thermal conductivity, W(mK)—0.14
loss tangent of a dielectric—$1.65 \times 10^{-3}$ The sequence of adding the ingredients of the rubber stock to be vulcanized and operating conditions of vulcanization were the same as adopted in Example 1. Samples of the resultant vulcanizate were tested. The test results are given below:
tensile strength at 20° C., kg/cm$^2$—162
tensile strength at 100° C. m kg/cm$^2$—101
elongation, %—681
permanent elongation, %—14
vibration increase at a resonance frequency—3.5
loss factor—0.21
modulus of elasticity, $10^{-9}$N/m$^2$—2.5
loss modulus, $10^{-9}$N/m$^2$—0.51

Thus, decreasing the amount of the oxidized oligomer derived from thermally decomposed rubber materials based on isoprene rubber effects the vibration-damping properties of the resultant vulcanizate produced from said vulcanizable rubber stock.

EXAMPLE 34 (COMPARATIVE)

A vulcanizable rubber stock comprises the following ingredients measured in parts by weight:
butadiene-methyl styrene rubber—100
bitumen with a high melting point—5
stearin—1
phenyl-$\beta$-naphthylamine—0.75
zinc oxide—1
sulfur—1
diphenyl guanidine—1
carbon black—20
oxidized oligomer derived from thermally decomposed rubber materials based on butadiene-styrene rubber—70

The oxidized oligomer derived from thermally decomposed rubber materials based on butadiene-styrene rubber was produced using the procedure substantially similar to that described in Example 9.

The oligomer thus obtained had the following properties:
density at 20° C., g/cm$^3$—0.9 305
molecular weight—408
vetrifying temperature, °C.—−73
solubility, wt %:
  in benzene—99.9
  in chloroform—99.9
presence of the functional groups, mg KOH/g:
  hydroxyl—11.53
  carbonyl—0.81
  carboxyl—2.56
  ester—21.6
specific heat, kJ/kgK—1.82
thermal conductivity, W/mk—0.15
loss tangent of a dielectric—$1.9 \times 10^{-3}$ The sequence of adding the ingredients of the rubber stock to be vulcanized and operating conditions of vulcanization were the same as adopted in Example 1. Samples of the resultant vulcanizate were tested. The test results are given below:
tensile strength at 20° C., kg/cm$^2$—85
tensile strength at 100° C., kg/cm$^2$—56
elongation, %—620
permanent elongation, %—36
vibration increase at resonance frequency—52
loss factor—0.18
modulus of elasticity, $10^{-9}$N/m$^2$—2.3
loss modulus, $10^{-9}$N/m$^2$—0.45

Thus, increasing the amount of the oxidized oligomer derived from thermally decomposed rubber materials based on butadiene-styrene rubber affects to a great extent the vibration-damping and physico-mechanical properties of the resultant vulcanizate.

While particular embodiments of the invention have been shown and described various modifications thereof will be apparent to those skilled in the art and therefore it is not intended that the invention be limited to the disclosed embodiments or to the details thereof and the departures may be made therefrom within the spirit and scope of the invention as defined in the claims.

We claim:

1. Vulcanizable rubber stock based on diene rubber, comprising: oxidized oligomer prepared by thermally decomposing rubber comprising an addition polymer of one or more ethylenically unsaturated monomers by heating said rubber at a temperature above the decomposition temperature thereof for a sufficient time and oxidizing the decomposed rubber, said oxidized oligomer being contained in said rubber stock in an amount of 5-68 parts by weight per 100 parts by weight of diene rubber.

2. Vulcanizable rubber stock comprising butadiene-nitrile rubber according to claim 1, wherein said oxidized oligomer is oligomer derived from thermally decomposed and oxidized rubber materials based on butylene and butadiene-styrene rubber wherein said oxidized oligomer is contained in said rubber stock in an amount of 5 to 56 parts by weight per 100 parts by weight of butadiene-nitrile rubber.

3. Vulcanizable rubber stock comprising butadiene-nitrile rubber according to claim 1, wherein said oxidized oligomer is oligomer derived from thermally decomposed and oxidized rubber materials based on butadiene-nitrile rubber wherein, said oxidized oligomer is contained in said rubber stock in an amount of 10 to 40 parts by weight of butadiene-nitrile rubber.

4. Vulcanizable rubber stock comprising butadiene-nitrile rubber according to claim 1, wherein said oxidized oligomer is oligomer derived from thermally decomposed and oxidized rubber materials based on butadiene rubber wherein, said oxidized oligomer is contained in said rubber stock in an amount of 6 to 60 parts by weight per 100 parts by weight of butadiene-nitrile rubber.

5. Vulcanizable rubber stock comprising butadiene-methyl styrene rubber according to claim 1, wherein said oxidized oligomer is oligomer derived from thermally decomposed and oxidized rubber materials based on butadiene-styrene rubber wherein, said oxidized oligomer is contained in said rubber stock in an amount of 8 to 32 parts by weight per 100 parts by weight of butadiene-methyl styrene rubber.

6. Vulcanizable rubber stock comprising butadiene-nitrile rubber according to claim 1, wherein said oxidized oligomer is oligomer derived from thermally decomposed and oxidized rubber materials based on ethylene-propylene rubber wherein, said oxidized oligomer is contained in said rubber stock in an amount of 7 to 64 parts by weight per 100 parts by weight of butadiene-nitrile rubber.

7. Vulcanizable rubber compound according to claim 1, wherein said oxidized oligomer is oligomer derived from thermally decomposed and oxidized rubber materials based on isobutylene rubber and butadiene-nitrile rubber wherein, said oxidized oligomer is contained in said rubber stock in an amount of 6 to 52 parts by weight per 100 parts by weight of butadiene-methyl styrene rubber.

8. Vulcanizable rubber stock comprising butadiene-nitrile rubber according to claim 1, wherein said oxidized oligomer is oligomer derived from thermally decomposed and oxidized rubber materials based on isobutylene rubber and butadiene-nitrile rubber wherein, said oxidized oligomer is contained in said rubber stock in an amount of 8 to 57 parts by weight per 100 parts by weight of butadiene-nitrile rubber.

9. Vulcanizable rubber stock comprising butadiene-nitrile rubber according to claim 1, wherein said oxidized oligomer is oligomer derived from thermally decomposed and oxidized rubber materials based on butadiene rubber and butadiene-styrene rubber wherein, said oxidized oligomer is contained in said rubber stock in an amount of 5 to 50 parts by weight per 100 parts by weight of butadiene-nitrile rubber.

10. Vulcanizable rubber stock comprising butadiene-nitrile rubber according to claim 1, wherein said oxidized oligomer is oligomer derived from thermally decomposed and oxidized rubber materials based on isoprene rubber wherein, said oxidized oligomer is contained in said rubber stock in an amount of 5 to 40 parts by weight per 100 parts by weight of butadiene-nitrile rubber.

11. Vulcanizable rubber stock according to claim 1 wherein said rubber is thermally decomposed at a temperature of from 373° to 424° C. for 0.7 to 2.9 hours under a pressure of $1.2 \times 10^5$ to $4.6 \times 10^5 N/m^2$ and then oxidizing the thermally decomposed rubber with air at a temperature of from 258° to 293° C. for 0.9 to 35 hours under a pressure of $1.5 \times 10^5$ to $3.5 \times 10^5 N/m^2$, with specific air consumption being from 38 to 100 l/hr kg.

* * * * *